United States Patent
Chan et al.

(10) Patent No.: US 8,517,770 B1
(45) Date of Patent: Aug. 27, 2013

(54) CARD CONNECTOR

(75) Inventors: Ching-Jung Chan, New Taipei (TW); Ta-Chih Yu, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 0 days.

(21) Appl. No.: 13/413,367

(22) Filed: Mar. 6, 2012

(51) Int. Cl.
  *H01R 24/00* (2011.01)
(52) U.S. Cl.
  USPC ............ 439/630; 439/945; 439/946; 439/159
(58) Field of Classification Search
  USPC .................................. 439/159, 630, 945, 946
  See application file for complete search history.

(56) References Cited

U.S. PATENT DOCUMENTS

| | | | | |
|---|---|---|---|---|
| 6,069,795 | A * | 5/2000 | Klatt et al. | 361/737 |
| 6,097,605 | A * | 8/2000 | Klatt et al. | 361/737 |
| 6,761,320 | B1 * | 7/2004 | Chen | 235/492 |
| 7,425,157 | B1 * | 9/2008 | Hung | 439/630 |
| 7,513,801 | B2 * | 4/2009 | Cheng et al. | 439/638 |
| 8,052,475 | B2 * | 11/2011 | Chan | 439/630 |
| 8,308,514 | B1 * | 11/2012 | Su et al. | 439/630 |

* cited by examiner

*Primary Examiner* — James Harvey
(74) *Attorney, Agent, or Firm* — Muncy, Geissler, Olds & Lowe, PLLC

(57) ABSTRACT

A card connector includes an insulating housing defining a receiving chamber and an inserting chamber connected with the receiving chamber, electrical terminals assembled in the insulating housing, and a shielding shell enclosing the insulating housing. Two receiving fillisters are opened in two inner sides of two side walls forming at two opposite sides of the receiving chamber. Two restraining members each has a base strip disposed in the receiving fillister, and an elastic arm inclined inward into the receiving chamber. The elastic arms are pressed into the receiving fillisters when a SIM card is inserted in the receiving chamber. In the process of inserting a micro SIM card into the card connector, the elastic arms resist against two opposite side edges of the micro SIM card to guide a rear of the micro SIM card to be smoothly inserted into the inserting chamber.

6 Claims, 4 Drawing Sheets

CARD CONNECTOR

BACKGROUND OF THE INVENTION

1. Field of the Invention

The present invention relates to a card connector, and more particularly to a card connector capable of inserting two kinds of different cards therein.

2. The Related Art

Traditionally, a card connector capable of receiving two kinds of different cards, such as a SIM card and a micro SIM card, includes an insulating housing, a plurality of electrical terminals assembled in the insulating housing and a shielding shell enclosing the insulating housing together with the electrical terminals. The insulating housing defines a receiving chamber for receiving the SIM card and the micro SIM card therein. However, the receiving chamber is often opened in accordance with the SIM card. So, only the SIM card can be exactly inserted in the receiving chamber of the card connector, but the micro SIM card has a smaller shape than the size of the receiving chamber. As a result, the micro SIM card often fails to be located in the correct position of the receiving chamber to electrically connect with the corresponding electrical terminals. Therefore, a card connector capable of overcoming the foregoing problem is required.

SUMMARY OF THE INVENTION

An object of the present invention is to provide a card connector, which is adapted for receiving a SIM card and a micro SIM card therein. The card connector includes an insulating housing of a substantially rectangular board shape with a receiving chamber opened along a front-to-rear direction in a top thereof and penetrating through a front side of the insulating housing. A pair of side walls forms at two opposite sides of the receiving chamber. A fool-proofing board is movably located in the receiving chamber, and a substantial middle of a front thereof is concaved rearward to form an inserting chamber. A pair of receiving fillisters is opened in two face-to-face inner sides of the side walls to connect with the receiving chamber and each extends along the front-to-rear direction in front of the fool-proofing board. A bottom side of the receiving chamber defines a plurality of terminal cavities. A plurality of electrical terminals is assembled in the terminal cavities of the insulating housing respectively and elastically stretches upward into the receiving chamber and the inserting chamber. Two restraining members each has a base strip disposed in a front of the corresponding receiving fillister of the insulating housing, and an elastic arm extending rearward from a rear end of the base strip and inclined inward to stretch into the receiving chamber. A shielding shell encloses the insulating housing together with the electrical terminals and the restraining members. In use, the elastic arms of the restraining members are pressed into the corresponding receiving fillisters when the SIM card is inserted in the receiving chamber to electrically contact with the electrical terminals. In the process of inserting the micro SIM card into the card connector, the elastic arms of the restraining members elastically resist against two opposite side edges of the micro SIM card so as to guide a rear of the micro SIM card to be smoothly inserted into the inserting chamber and further realize an electrical connection between the micro SIM card and the electrical terminals.

As described above, the card connector utilizes the elastic arms of the restraining members stretched in the receiving chamber, to elastically resist against the two opposite side edges of the micro SIM card and restrain the micro SIM card therebetween in the process of inserting the micro SIM card into the card connector, so as to ensure that the rear of the micro SIM card is smoothly inserted into the inserting chamber. So, an accurate electrical connection can be assured between the micro SIM card and the electrical terminals.

BRIEF DESCRIPTION OF THE DRAWINGS

The present invention will be apparent to those skilled in the art by reading the following description with reference to the attached drawings, in which.

DETAILED DESCRIPTION OF THE PREFERRED EMBODIMENT

Figure 1:
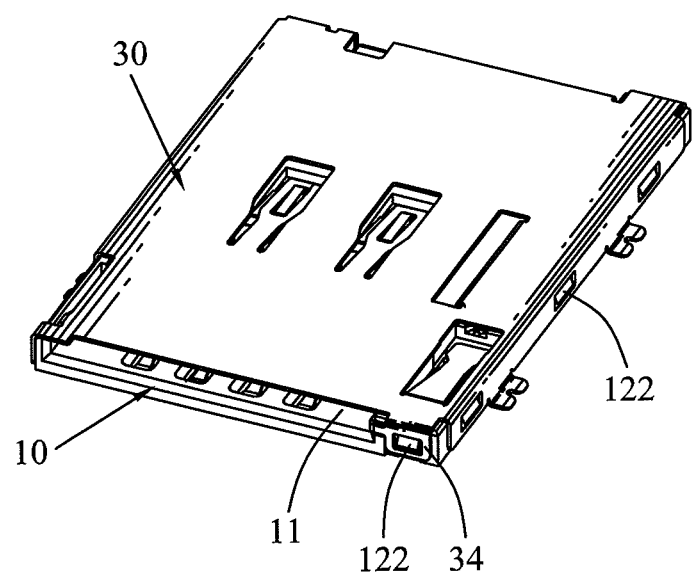
FIG. 1 is an assembled perspective view of a card connector in accordance with a first embodiment of the present invention.

Referring to FIGS. 2-5, a card connector according to the present invention is adapted for receiving a SIM card 40 and a micro SIM card 50 therein. The card connector includes an insulating housing 10, a plurality of electrical terminals 20, two restraining members 33 and a shielding shell 30.

Referring to FIGS. 1-5, the insulating housing 10 is of a substantially rectangular board shape, and has a receiving chamber 11 opened along a front-to-rear direction in a top thereof and penetrating through a front side of the insulating housing 10. Accordingly, a pair of side walls 12 forms at two opposite sides of the receiving chamber 11. A fool-proofing board 13 is movably located in the receiving chamber 11, and a substantial middle of a front thereof is concaved rearward to form an inserting chamber 131. A pair of receiving fillisters 121 is opened in two face-to-face inner sides of the side walls 12 to connect with the receiving chamber 11 and each extends along the front-to-rear direction in front of the fool-proofing board 13. A bottom side of the receiving chamber 11 defines a plurality of terminal cavities 111. The electrical terminals 20 are assembled in the terminal cavities 111 of the insulating housing 10 respectively and elastically stretch upward into the receiving chamber 11 and the inserting chamber 131. Each of the restraining members 33 has a base strip 331 disposed in a front of the corresponding receiving fillister 121 of the insulating housing 10, and an elastic arm 332 extending rearward from a rear end of the base strip 331 and inclined inward to stretch into the receiving chamber 11. The shielding shell 30 encloses the insulating housing 10 together with the electrical terminals 20 and the restraining members 33.

In use, the elastic arms 332 of the restraining members 33 are pressed into the corresponding receiving fillisters 121 when the SIM card 40 is inserted in the receiving chamber 11 to electrically contact with the electrical terminals 20. In the process of inserting the micro SIM card 50 into the card connector, the elastic arms 332 of the restraining members 33 elastically resist against two opposite side edges of the micro SIM card 50 so as to guide a rear of the micro SIM card 50 to be smoothly inserted into the inserting chamber 131 and further realize an electrical connection between the micro SIM card 50 and the electrical terminals 20.

Figure 2:
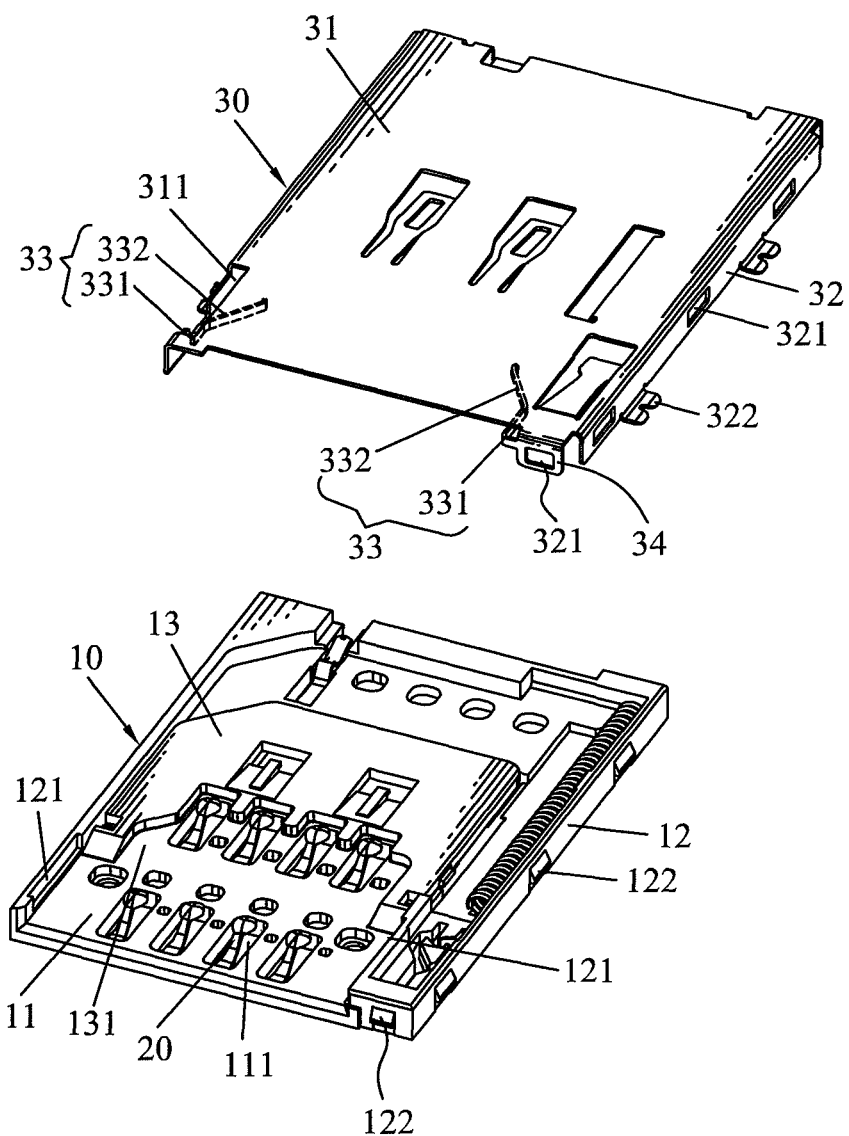
FIG. 2 is a partially exploded view of the card connector of FIG. 1.
Figure 3:
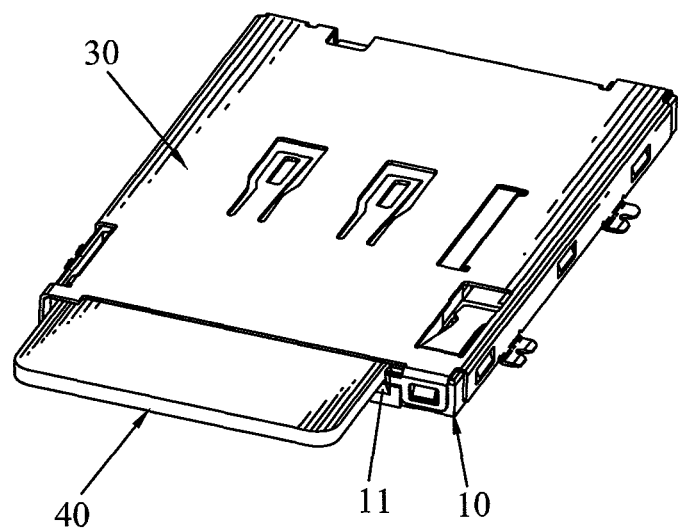
FIG. 3 is a use perspective view of the card connector of FIG. 1, in which a SIM card is inserted.
Figure 4:
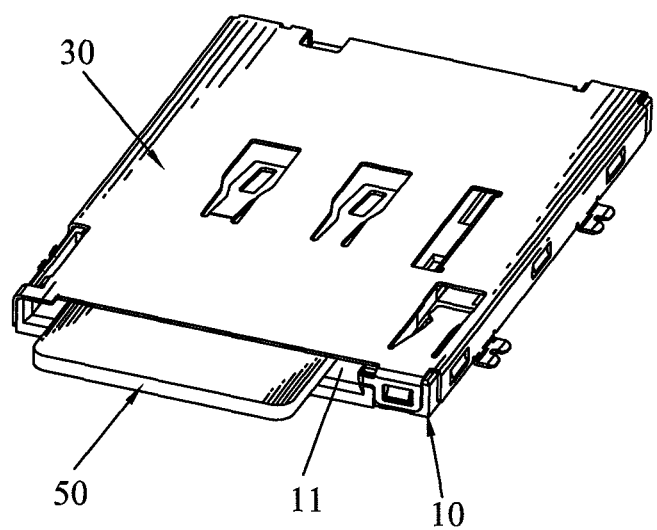
FIG. 4 is another use perspective view of the card connector of FIG. 1, in which a micro SIM card is inserted.
Figure 5:
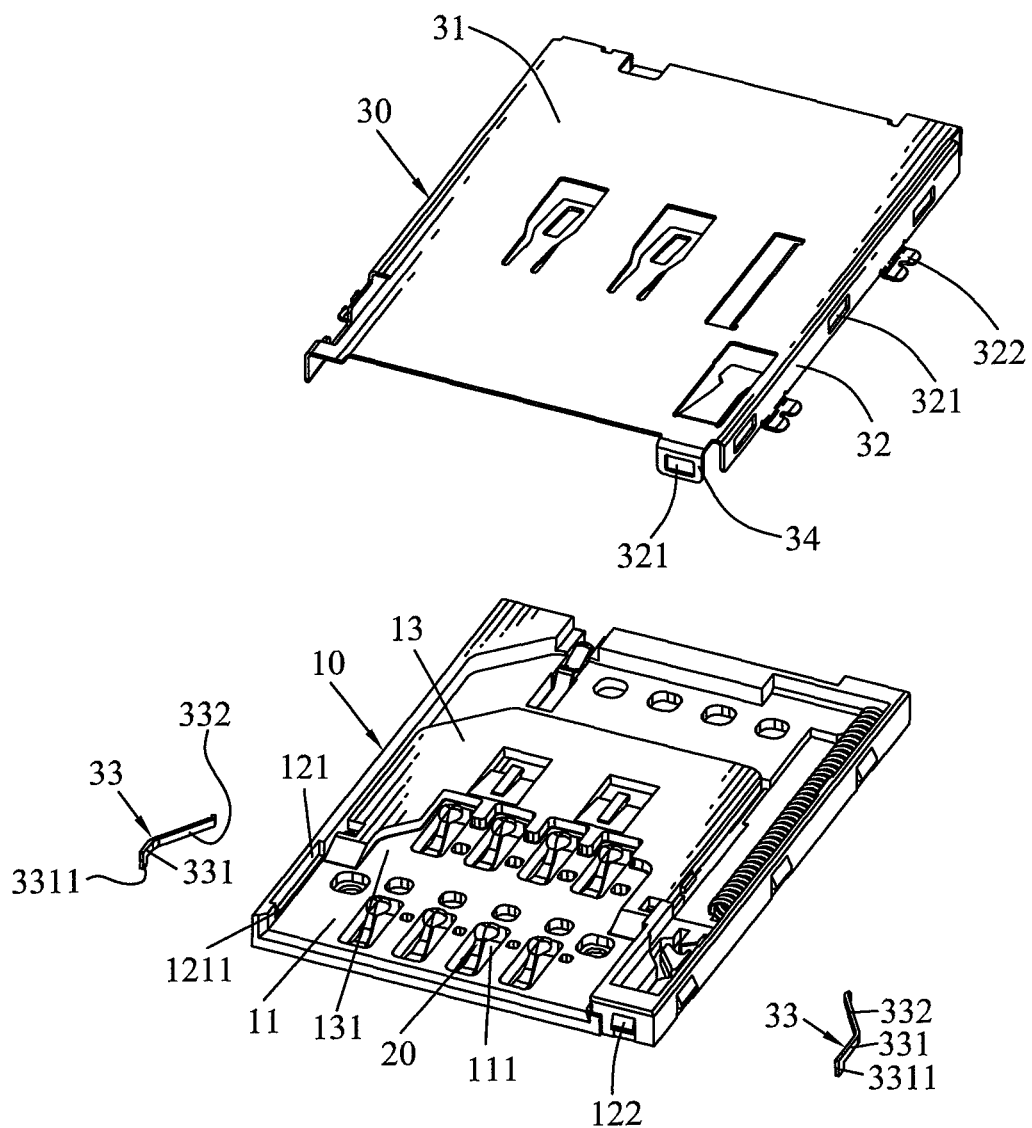
FIG. 5 is a partially exploded view of a card connector in accordance with a second embodiment of the present invention.

Referring to FIG. 1, FIG. 2 and FIG. 5, the shielding shell 30 has a top plate 31 covered on the insulating housing 10, and two side plates 32 extending downward from two opposite side edges of the top plate 31 to abut against two opposite outer sides of the side walls 12. A front edge of one side of the top plate 31 protrudes downward to form a holding plate 34 resisting against a front end of one side wall 12. The two opposite outer sides of the side walls 12 and the front end of the one side wall 12 protrude outward to form a plurality of fastening blocks 122. A plurality of buckling holes 321 is opened in the side plates 32 and the holding plate 34 for buckling the corresponding fastening blocks 122 therein. Bottom edges of the side plates 32 oppositely bend outward to form a plurality of soldering tails 322.

Referring to FIG. 2, it shows a first embodiment of the card connector. In the first embodiment, a front end of the base strip 331 of one restraining member 33 is connected with a side edge of the holding plate 34 with the base strip 331 and the elastic arm 332 being located under the top plate 31. A front of the other side of the top plate 31 defines an opening 311 facing the corresponding receiving fillister 121. A top edge of the base strip 331 of the other restraining member 33 is connected with a front of an inner edge of the opening 311 with the elastic arm 332 being located under the top plate 31.

Referring to FIG. 5, it shows a second embodiment of the card connector. In the second embodiment, the restraining members 33 are independent of the shielding shell 30. Each base strip 331 of the restraining members 33 protrudes downward to form a fastening tail 3311. A bottom side of the front of each receiving fillister 121 is concaved downward to form a fastening fillister 1211 fixing the fastening tail 3311 therein.

As described above, the card connector of the present invention utilizes the elastic arms 332 of the restraining members 33 stretched in the receiving chamber 11 of the insulating housing 10, to elastically resist against the two opposite side edges of the micro SIM card 50 and restrain the micro SIM card 50 therebetween in the process of inserting the micro SIM card 50 into the card connector, so as to ensure that the rear of the micro SIM card 50 is smoothly inserted into the inserting chamber 131. So, an accurate electrical connection can be assured between the micro SIM card 50 and the electrical terminals 20.

What is claimed is:

1. A card connector adapted for receiving a SIM card and a micro SIM card therein, comprising:

an insulating housing of a substantially rectangular board shape with a receiving chamber opened along a front-to-rear direction in a top thereof and penetrating through a front side of the insulating housing, a pair of side walls forming at two opposite sides of the receiving chamber, a fool-proofing board being movably located in the receiving chamber and a substantial middle of a front thereof being concaved rearward to form an inserting chamber, a pair of receiving fillisters being opened in two face-to-face inner sides of the side walls to connect with the receiving chamber and each extending along the front-to-rear direction in front of the fool-proofing board, a bottom side of the receiving chamber defining a plurality of terminal cavities;

a plurality of electrical terminals assembled in the terminal cavities of the insulating housing respectively and elastically stretching upward into the receiving chamber and the inserting chamber;

two restraining members of which each has a base strip disposed in a front of the corresponding receiving fillister of the insulating housing, and an elastic arm extending rearward from a rear end of the base strip and inclined inward to stretch into the receiving chamber; and a shielding shell enclosing the insulating housing together with the electrical terminals and the restraining members, wherein the elastic arms of the restraining members are pressed into the corresponding receiving fillisters when the SIM card is inserted in the receiving chamber to electrically contact with the electrical terminals, in the process of inserting the micro SIM card into the card connector, the elastic arms of the restraining members elastically resist against two opposite side edges of the micro SIM card so as to guide a rear of the micro SIM card to be smoothly inserted into the inserting chamber and further realize an electrical connection between the micro SIM card and the electrical terminals.

2. The card connector as claimed in claim 1, wherein the shielding shell has a top plate covered on the insulating housing, and two side plates extending downward from two opposite side edges of the top plate to abut against two opposite outer sides of the side walls, a front edge of one side of the top plate protrudes downward to form a holding plate resisting against a front end of one side wall.

3. The card connector as claimed in claim 2, wherein a front end of the base strip of one restraining member is connected with a side edge of the holding plate with the base strip and the elastic arm being located under the top plate, a front of the other side of the top plate defines an opening facing the corresponding receiving fillister, a top edge of the base strip of the other restraining member is connected with a front of an inner edge of the opening with the elastic arm being located under the top plate.

4. The card connector as claimed in claim 2, wherein the two opposite outer sides of the side walls and the front end of the one side wall protrude outward to form a plurality of fastening blocks, a plurality of buckling holes is opened in the side plates and the holding plate for buckling the corresponding fastening blocks therein.

5. The card connector as claimed in claim 4, wherein bottom edges of the side plates oppositely bend outward to form a plurality of soldering tails.

6. The card connector as claimed in claim 1, wherein each base strip of the restraining members protrudes downward to form a fastening tail, a bottom side of the front of each receiving fillister is concaved downward to form a fastening fillister fixing the fastening tail therein.

* * * * *